United States Patent
Park

(10) Patent No.: US 9,420,025 B2
(45) Date of Patent: *Aug. 16, 2016

(54) METHOD AND APPARATUS FOR REPRODUCING CONTENT IN MULTIMEDIA DATA PROVIDING SYSTEM

(71) Applicant: Samsung Electronics Co., Ltd., Gyeonggi-do (KR)

(72) Inventor: Il-Woo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,178

(22) Filed: Mar. 24, 2015

(65) Prior Publication Data

US 2015/0195323 A1    Jul. 9, 2015

Related U.S. Application Data

(63) Continuation of application No. 13/009,496, filed on Jan. 19, 2011, now Pat. No. 9,002,987.

(30) Foreign Application Priority Data

Jan. 20, 2010    (KR) .................. 10-2010-0005363

(51) Int. Cl.
*H04L 29/06*   (2006.01)
*H04L 12/28*   (2006.01)

(52) U.S. Cl.
CPC .............. *H04L 65/60* (2013.01); *H04L 12/281* (2013.01); *H04L 12/2809* (2013.01); *H04L 12/2816* (2013.01); *H04L 65/4076* (2013.01); *H04L 65/604* (2013.01); *H04L 65/605* (2013.01);

(Continued)

(58) Field of Classification Search
CPC ..... H04L 65/60; H04L 67/42; H04L 12/2809; H04L 12/281; H04L 12/2816
See application file for complete search history.

(56) References Cited

U.S. PATENT DOCUMENTS 7,636,705 B2 * 12/2009 Kim
2004/0208184 A1 * 10/2004 Tanaka et al. ................. 370/397

(Continued)

FOREIGN PATENT DOCUMENTS

KR    1020030095897 A    12/2003
KR     100743552 B1    7/2007

(Continued)

OTHER PUBLICATIONS

Korean Office Action dated Dec. 14, 2015 issued in counterpart application No. 10-2010-0005363, 16 pages.

*Primary Examiner* — Michael C Lai
(74) *Attorney, Agent, or Firm* — The Farrell Law Firm, P.C.

(57) ABSTRACT

A content reproducing method is provided for continuously reproducing content being reproduced by a client device in another client device in a multimedia data providing system including a server for providing content and a plurality of client devices for reproducing the content provided by the server. The method includes reproducing, by a first device, multimedia content being streamed by a content server; and transmitting, by the first device, a first request message for continuously reproducing content being reproduced by the first device in another device and an IDentification (ID) of the first device to another device using local area communication in order to continuously reproduce the content being reproduced by the first device in another device.

25 Claims, 11 Drawing Sheets

(52) U.S. Cl.
CPC ......... *H04L 67/42* (2013.01); *H04L 2012/2849* (2013.01)

(56) References Cited

U.S. PATENT DOCUMENTS

| | | | |
|---|---|---|---|
| 2005/0204065 A1* | 9/2005 | Son et al. | 709/248 |
| 2007/0070060 A1* | 3/2007 | Kagawa et al. | 345/418 |
| 2007/0089145 A1* | 4/2007 | Medford et al. | 725/81 |
| 2007/0136101 A1* | 6/2007 | Hayatsu | 705/3 |
| 2007/0136488 A1* | 6/2007 | Cho et al. | 709/231 |
| 2008/0197980 A1* | 8/2008 | Howarth et al. | 340/10.2 |
| 2009/0216351 A1* | 8/2009 | Van Horck et al. | 700/94 |
| 2009/0248702 A1* | 10/2009 | Schwartz et al. | 707/10 |
| 2010/0042702 A1* | 2/2010 | Hanses | 709/219 |
| 2010/0099359 A1 | 4/2010 | Lee et al. | |
| 2011/0060998 A1* | 3/2011 | Schwartz et al. | 715/738 |

FOREIGN PATENT DOCUMENTS

| | | |
|---|---|---|
| KR | 1020080078973 | 8/2008 |
| KR | 1020090065761 | 6/2009 |

* cited by examiner

METHOD AND APPARATUS FOR REPRODUCING CONTENT IN MULTIMEDIA DATA PROVIDING SYSTEM

PRIORITY

This application is a continuation of U.S. patent application Ser. No. 13/009,496, which was filed on Jan. 19, 2011, now U.S. Pat. No. 9,002,987, which claims priority under 35 U.S.C. §119(a) to an application entitled "Method and Apparatus for Reproducing Content in Multimedia Data Providing System" filed in the Korean Intellectual Property Office on Jan. 20, 2010 and assigned Serial No. 10-2010-0005363, the entire disclosure of which is incorporated herein by reference.

BACKGROUND OF THE INVENTION

1. Field of the Invention

The present invention generally relates to a system, such as a home server, for providing multimedia data to multiple users and multiple devices, and, in particular, to a content reproducing method and apparatus for allowing another device to continuously reproduce content being streamed by a home server.

2. Description of the Related Art

A multimedia broadcasting system for providing multimedia data to multiple users and multiple devices generally includes a home server for streaming multimedia data and at least one client for receiving and reproducing the multimedia data being streamed by the home server. Such a multimedia broadcasting system can be configured by using a Universal Plug and Play (UPnP) protocol. In this case, the UPnP protocol is used to inform a location of a host in a local network or allow the use of a device. In the case of the use of the UPnP protocol, each device (i.e., client) can know only an IP address of a server providing a service, knowledge of the actual physical location of the server by the client is not required.

Devices receiving multimedia content can perform communication between each other by local area communication. The local area communication can use a communication scheme, such as ZigBee, Bluetooth®, infrared communication, or optical communication. For local area communication, an operation, such as a Personal Identification Number (PIN) code exchange, of detecting locations of devices is required for interaction between the devices.

Generally, each client in such a multimedia content providing system has location information of a server but does not have information regarding other clients. Additionally, since conventional location information is information based on a network, it cannot express a device in an actual physical space, and an additional process for exchanging location information between devices, such as a PIN code exchange in Bluetooth®, is required for communication between the devices.

SUMMARY OF THE INVENTION

An object of the present invention is to substantially solve at least the above problems and/or disadvantages and to provide at least the advantages below. Accordingly, an object of the present invention is to provide a content reproducing method and apparatus for allowing another device to seamlessly reproduce content being streamed by a home server in a system, such as the home server, for providing multimedia data to multiple users and multiple devices multiple users and multiple devices.

According to one aspect of the present invention, there is provided a content reproducing method for continuously reproducing content being reproduced by a client device in another client device in a multimedia data providing system including a server for providing content and a plurality of client devices for reproducing the content provided by the server, the content reproducing method including: reproducing, by a first device, multimedia content being streamed by a content server; transmitting, by the first device, a first request message for continuously reproducing content being reproduced by the first device in another device and an IDentification (ID) of the first device to another device through local area communication in order to continuously continuously reproduce the content being reproduced by the first device in another device; receiving, by a second device, the first request message transmitted by the first device and the ID of the first device through the local area communication; transmitting, by the second device, the first request message, the ID of the first device, and ID information of the second device to the content server; stopping, by the content server, streaming to the first device; storing, by the content server, the ID of the first device and the ID of the second device; and switching, by the content server, the multimedia content being streamed to the first device to the second device so that the second device continuously reproduces the multimedia content.

According to another aspect of the present invention, there is provided a content reproducing method for continuously reproducing content being reproduced by a client device in another client device in a multimedia data providing system including a server for providing content and a plurality of client devices for reproducing the content provided by the server, the content reproducing method including: transmitting, by a first device, a request message for continuously reproducing multimedia content being reproduced by a second device and an IDentification (ID) of the first device to the second device through local area communication in order for the first device to continuously reproduce second multimedia content being reproduced by the second device; transmitting, by the second device, the request message, the ID of the first device, and ID information of the second device to the content server; storing, by the content server, the ID of the first device and the ID of the second device; stopping, by the content server, streaming to the second device; and switching, by the content server, the second multimedia content being streamed to the second device to the first device so that the first device continuously reproduces the second multimedia content.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention will be described herein below with reference to the accompanying drawings. In the following description, although many specific items, such as components of a system, are shown, they are only provided to help with the general understanding of the present invention, and it will be understood by those of ordinary skill in the art that the present invention can be implemented without these specific items. In the following description, well-known functions or constructions are not described in detail since they would obscure the invention.

According to the present invention, a client device transmits device information thereof and a control message to another client device which a user desires to control through local area communication using an InfraRed (IR) device having directivity in a multimedia content providing system so that content being reproduced by a mobile terminal can be simply continuously reproduced by another device. Additionally, an originally reproducing device can continuously reproduce original content by stopping reproduction of the original content switched to and being continuously reproduced by another device.

Figure 1:
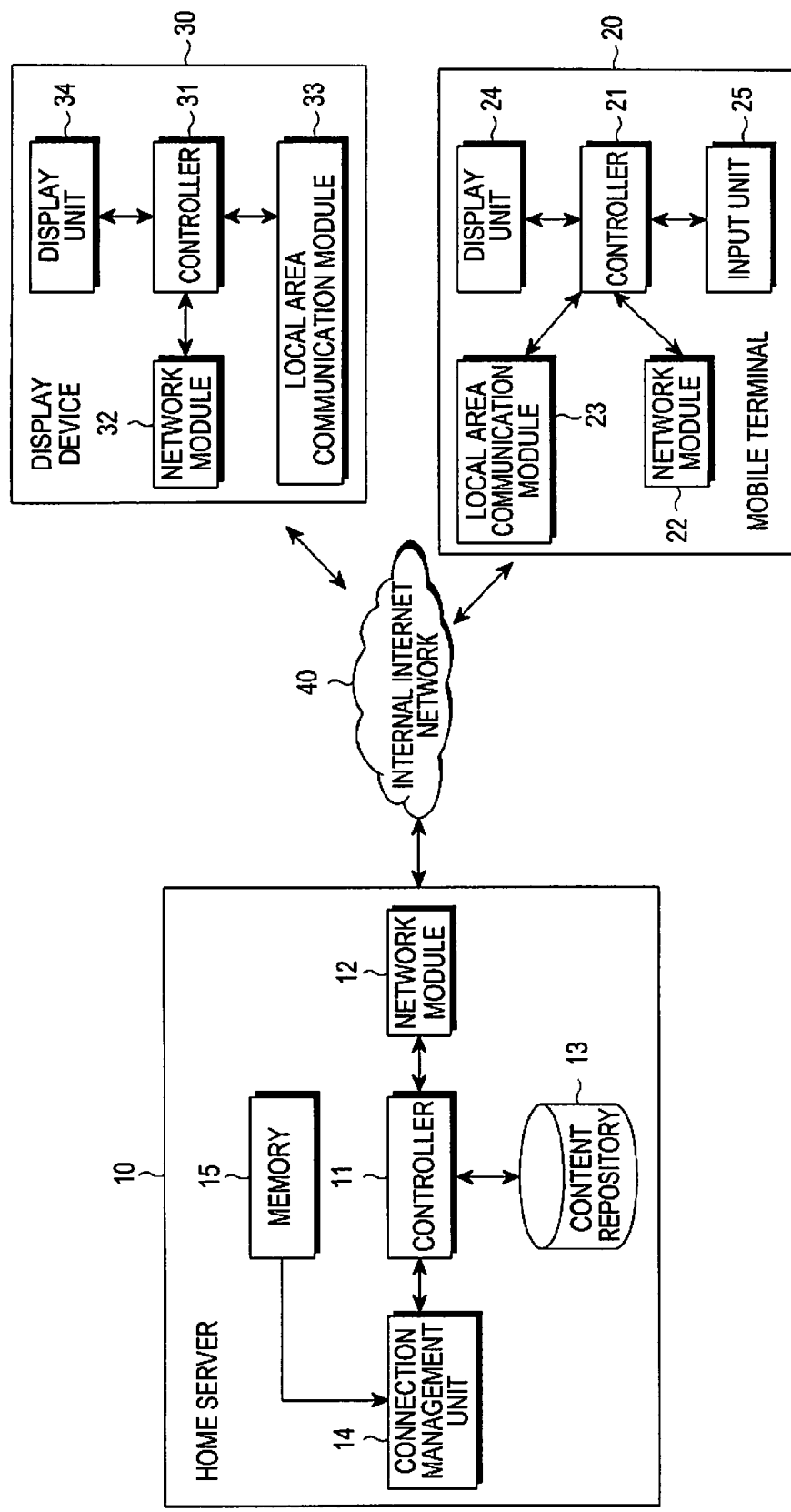
FIG. 1 illustrates a block diagram of a system for providing multimedia content to multiple users and multiple devices according to an embodiment of the present invention.

FIG. 1 illustrates a system for providing multimedia content to multiple users and multiple devices, according to an embodiment of the present invention.

Referring to FIG. 1, the multimedia content providing system includes a home server (content server, streaming server) 10 for providing content and at least one client device. In the current embodiment, examples of the at least one client device are a mobile terminal 20 and a display device 30.

The home server 10 includes a connection management unit 14 for broadcasting location information of the home server to an internal Internet network 40 through a network module 12 to be described later and managing an address and a product name of each terminal, a memory 15 for storing an Internet Protocol (IP) address, a product name, and reproduction capability of each client device for the connection management unit 14 to use, a content depository 13 for storing streaming multimedia content, the network module 12 for transmitting and receiving multimedia content and a control signal through the internal Internet network 40 using IP, and a controller 11 for controlling each component.

According to an embodiment of the present invention, when the controller 11 receives a first request message for continuously reproducing content being reproduced by the mobile terminal 20 in the display device 30, an IDentification (ID) of the mobile terminal 20, and an ID of the display device 30 from the display device 30, the controller 11 stops streaming the content to the mobile terminal 20, stores the ID of the mobile terminal 20 and the ID of the display device 30, and switches the streaming so that the display device 30 continuously reproduces multimedia content being streamed to the mobile terminal 20. Additionally, if the controller 11 receives a second request message for continuously reproducing the content being reproduced by the display device 30 from the mobile terminal 20, the controller 11 determines whether a device, which has transmitted the second request message, is identical to a device, which has transmitted the first request message, and if the device, which has transmitted the second request message, is identical to the device, which has transmitted the first request message, the controller 11 stops streaming the content to the display device 30 and switches the streaming so that the mobile terminal 20 continuously reproduces the content.

When switching the streaming, the controller 11 converts the streamed multimedia content to reproducible content by considering the reproduction capability of a device to which the multimedia content is streamed, and if the streamed multimedia content cannot be reproduced by the device to which the multimedia content is streamed, the controller 11 transmits a message to inform the device that transmitted the first or second request message that reproduction is impossible.

When the controller 11 receives a plurality of first request messages within a predetermined time, the controller 11 determines whether the plurality of first request messages has been transmitted by one device, and if the plurality of first request messages has been transmitted by one device, the controller 11 transmits information regarding IDs and product names of a plurality of devices which receive the first request message, to the device, which has transmitted the first request message.

When the controller 11 receives a third request message for continuously reproducing multimedia content being reproduced by the display device 30 and the ID of the mobile terminal 20 from the mobile terminal 20 through the local area communication, the controller 11 stores the ID of the mobile terminal 20 and the ID of the display device 30, stops streaming content to the mobile terminal 20, and switches streaming so that the mobile terminal 20 continuously reproduces second multimedia content being streamed to the display device 30. If the mobile terminal 20 is reproducing first multimedia content and the display device 30 is reproducing second multimedia content when the controller 11 receives the third request message, the content server 10 stores a reproduction position of the first multimedia content being streamed to the mobile terminal 20, stops streaming the first multimedia content, and switches the streaming so that the mobile terminal 20 continuously reproduces the second multimedia content being streamed to the display device 30. When the controller 11 receives a fourth request message for continuously reproducing the first multimedia content originally reproduced by the mobile terminal 20 from the mobile terminal 20, the controller 11 searches for the stored reproduction position of the first multimedia content and performs streaming in order for the mobile terminal 20 to continuously reproduce the first multimedia content from the found reproduction position.

The mobile terminal 20 of the client devices includes a local area communication module 23 for performing local area communication using IR generally used by remote controllers, a network module 22 for transmitting and receiving multimedia content and a control signal through the internal Internet network 40 using IP, an input unit 25, which is an input means such as physical keys and buttons and a touch screen and receives an input of a user, and a controller 21 for controlling each component of the mobile terminal 20. The controller 21 reproduces multimedia content streamed from the home server 10, and transmits a first request message for continuously reproducing content being reproduced by the mobile terminal 20 in another device and the ID of the mobile terminal 20 to another device through the local area communication in order to continuously reproduce the content being reproduced by the mobile terminal 20 in another device. In addition, the controller 21 transmits a third request message for continuously reproducing multimedia content being reproduced by another device and the ID of the mobile terminal 20 to another device through the local area communication in order to continuously reproduce second multimedia content being reproduced by another device.

The display device 30 includes a network module 32, a local area communication module 33, a controller 31, and a display unit, which perform the same operations as those of the mobile terminal 20.

Although IR communication is used for the local area communication module 23 in the current embodiment, a communication scheme using another medium having directivity, such as a visible spectrum or an ultrasonic wave can also be used.

Figure 2:
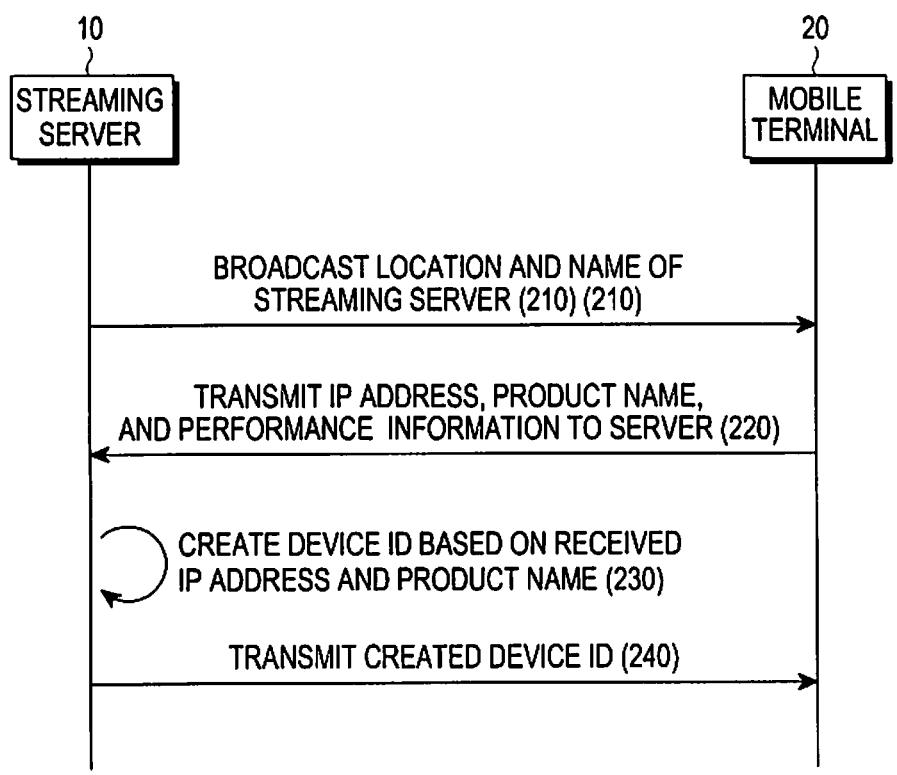
FIG. 2 illustrates a device registration operation in a multimedia content providing system, according to an embodiment of the present invention.

FIG. 2 illustrates a device registration operation in the multimedia content providing system, according to an embodiment of the present invention. An operation of initially registering the mobile terminal 20 in the streaming server 10 will now be described with reference to FIG. 2. In step 210, the streaming server 10 broadcasts a location (i.e., IP address) and a name of the streaming server 10. The mobile terminal 20 then receives information broadcasted by the streaming server 10 and transmits an IP address, a product name, and performance information of the mobile terminal 20 to the streaming server 10 in step 220. The performance information indicates content reproduction capability of the mobile terminal 20, such as resolution, a processing speed, and reproducible formats. The streaming server 10 creates a device ID based on the IP address and the product name received from the mobile terminal 20 in step 230 and transmits the created device ID to a corresponding device, i.e., the mobile terminal 20, in step 240.

In step 210, the streaming server 10 may perform the broadcasting by using a UPnP communication scheme. If a Control Point (CP) newly enters into home when a UPnP device exists in home, the streaming server 10 can perceive devices currently existing in home by broadcasting a Simple Service Discovery Protocol (SSDP) message. A device, which has received the SSDP message, transmits a response message containing an eXtensible Markup Language (XML) document for describing itself, the XML document includes its own IP address, its own product name, information regarding reproducible multimedia content, and its own reproduction capability.

Figure 3:
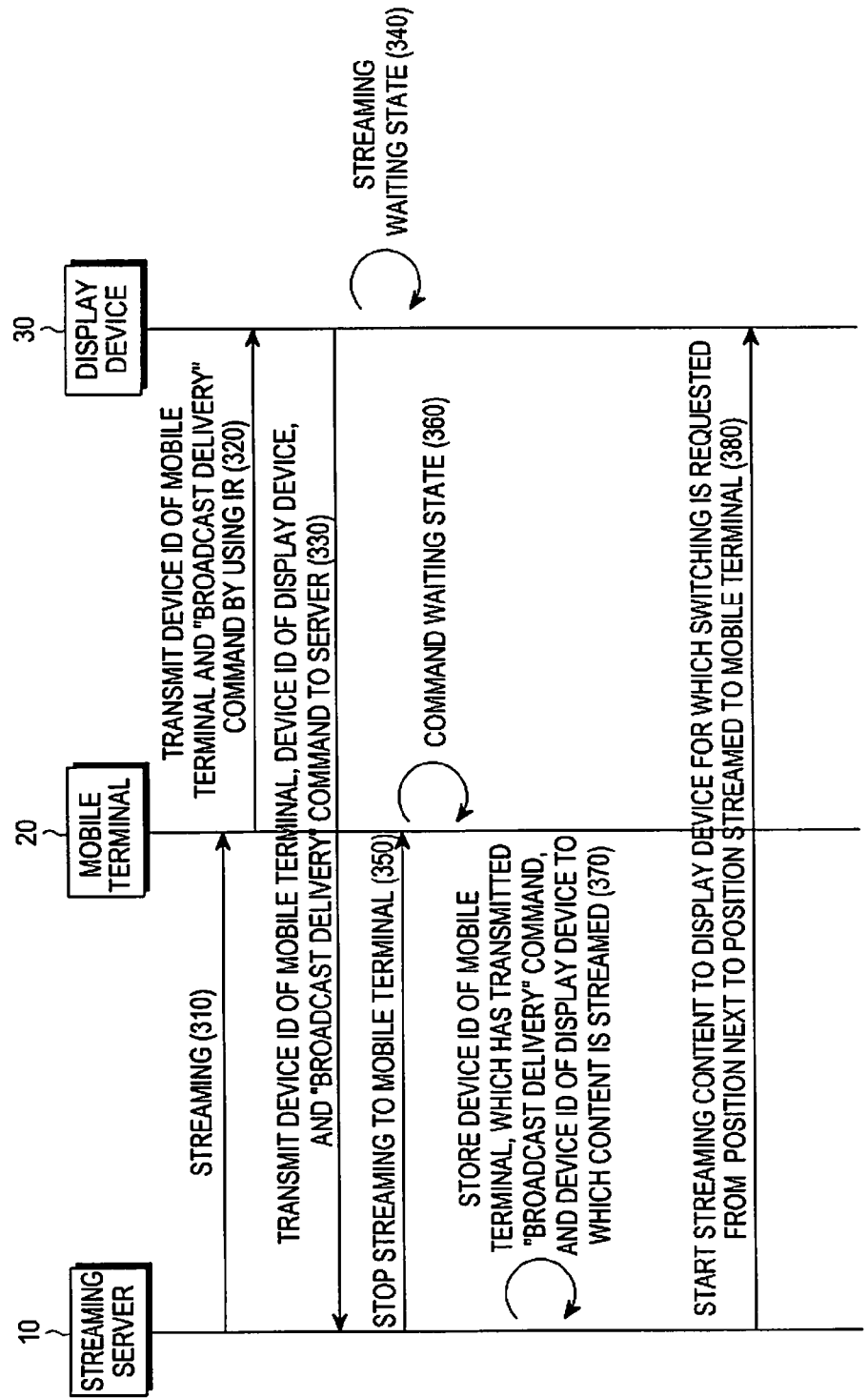
FIG. 3 illustrates an operation of continuously reproducing content being reproduced by a device in another device in the multimedia content providing system, according to an embodiment of the present invention.

FIG. 3 illustrates an operation of continuously reproducing content being reproduced by a device in another device in the multimedia content providing system, according to an embodiment of the present invention. Referring to FIG. 3, while the streaming server 10 is streaming multimedia content to the mobile terminal 20 in step 310, the mobile terminal 20 transmits its own device ID and a broadcast delivery command for continuously reproducing the multimedia content being reproduced by the mobile terminal 20 in another device to the display device 30 by using the local area communication module 23, such as an IR communication module, in step 320. Upon receiving the broadcast delivery command from the mobile terminal 20, the display device 30 transmits the received device ID, its own device ID, and the broadcast delivery command to the streaming server 10 in step 330 and enters into a streaming waiting state in step 340.

The streaming server 10 stops streaming the multimedia content to the mobile terminal 20 in step 350. The mobile terminal 20 enters into a command waiting state in step 360.

The streaming server 10 stores the device ID of the mobile terminal 20, which has transmitted the broadcast delivery command, and the device ID of the display device 30 to which the multimedia content is continuously transmitted, in step 370, and starts streaming in step 380 so that the display device 30 continuously reproduces the multimedia content being transmitted to the mobile terminal 20.

Figure 4:
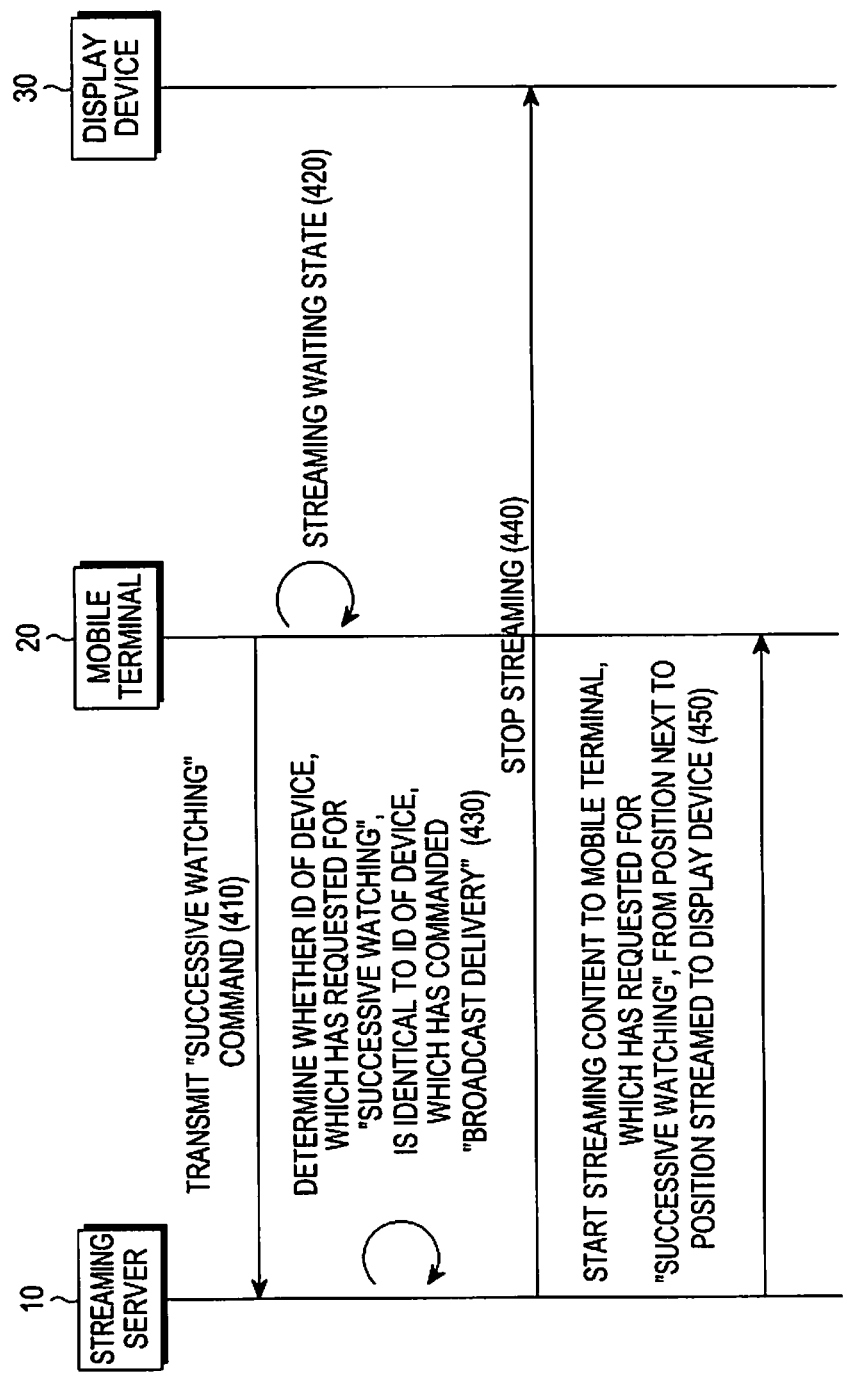
FIG. 4 illustrates an operation of continuously reproducing content switched to and being reproduced by another device in an own device again in the multimedia content providing system, according to an embodiment of the present invention.

FIG. 4 illustrates an operation of continuously reproducing content switched to and being reproduced by another device in an own device again in the multimedia content providing system, according to an embodiment of the present invention. Referring to FIG. 4, the mobile terminal 20 transmits a continuous watching command for reproducing content switched and streamed to another device in the mobile terminal 20 again to the streaming server 10 in step 410. The mobile terminal 20 enters into a streaming waiting state in step 420. The streaming server 10 determines in step 430 whether a device, which has transmitted the continuous watching command, is identical to a device, which has transmitted the broadcast delivery command, by determining whether an ID of the device, which has transmitted the continuous watching command, is identical to an ID of the device, which has transmitted the broadcast delivery command in step 320. If the devices are identical to each other, the streaming server 10 stops streaming the content to the display device 30 in step 440 and performs streaming in step 450 so that the mobile terminal 20, which has transmitted the continuous watching command, continuously reproduces the content streamed to the display device 30.

Figure 5:
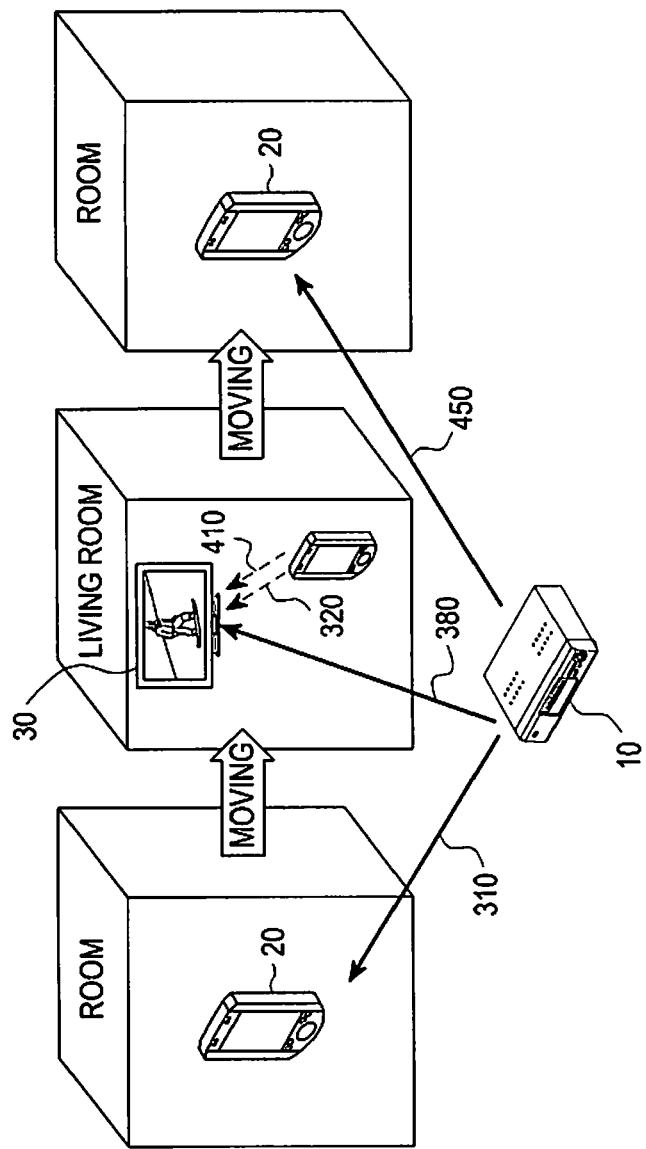
FIG. 5 illustrates an operation of transmitting and receiving a signal between a server and clients due to movement of a user when performing the operations of FIGS. 3 and 4.

FIG. 5 illustrates an operation of transmitting and receiving a signal between a server and clients due to the movement of a user when performing the operations of FIGS. 3 and 4.

Referring to FIG. 5, the user moves to a living room while watching (FIG. 3, step 310) content through the mobile terminal 20 and transmits (FIG. 3, step 320) a broadcast delivery command to a Television (TV) 30 in the living room through local area communication to watch the content which the user is watching through the TV 30 (FIG. 3, display device 30) in the living room. In this case, the broadcast delivery command may be transmitted by transmitting IR light toward the TV 30 in the local area communication module 23. Accordingly, the streaming server 10 switches (FIG. 3, step 380) streaming to the TV 30 in the living room so that the user can continuously watch the content, which has been being reproduced by the mobile terminal 20 through the TV 30 in the living room. The mobile terminal 20 may then stop reproducing the content. Otherwise, the same content may be reproduced by the mobile terminal 20 and the TV 30. If the same content is reproduced by the mobile terminal 20 and the TV 30, step 350 is omitted.

When the user moves to another room, if the mobile terminal 20 transmits (FIG. 4, step 410) a continuous watching command to the TV 30 in order to watch the content continuously, the streaming server 10 switches (FIG. 4, step 450) streaming from the TV 30 in the living room to the mobile terminal 20.

The server 10 or the mobile terminal 20 can be set such that multimedia content transmitted when switching streaming is converted to reproducible content by the streaming server 10 and transmitted by considering reproduction capability of a device to which the multimedia content is transmitted by the streaming server 10. If the reproduction capability of a device to which the multimedia content is transmitted by the streaming server 10 is impossible to reproduce the multimedia content, the streaming server 10 may inform the device, which has requested the transmission, of the reproduction impossibility.

Figure 6:
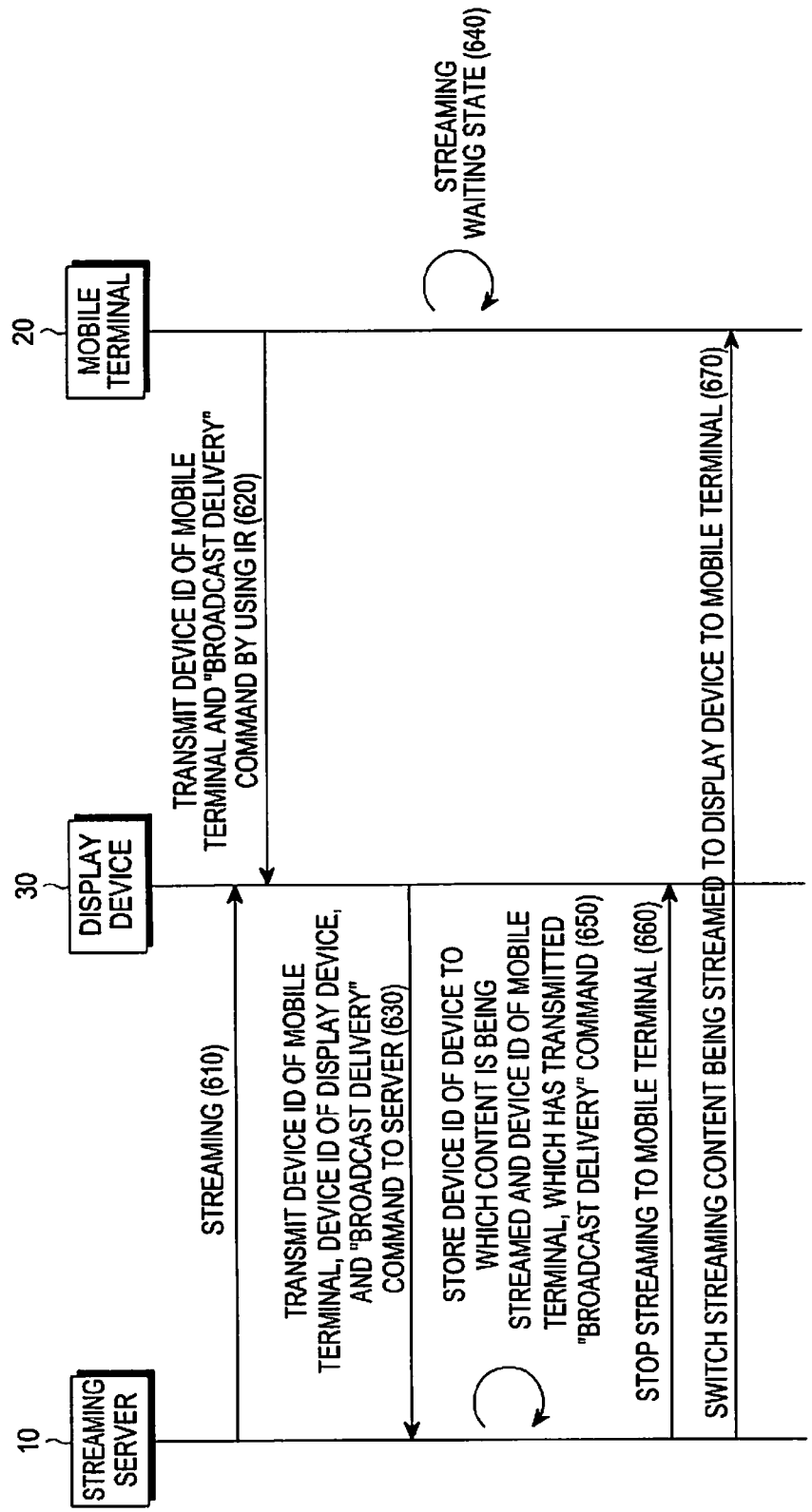
FIG. 6 illustrates an operation of continuously reproducing content being reproduced by another device in an own device in the multimedia content providing system, according to an embodiment of the present invention.

FIG. 6 illustrates an operation of continuously reproducing content being reproduced by another device in an own device in the multimedia content providing system, according to an embodiment of the present invention.

Referring to FIG. 6, while the streaming server 10 is streaming multimedia content to the display device 30 in step 610, if the mobile terminal 20 transmits its own device ID and a broadcast delivery command to the display device 30 through the local area communication module 23, such as an IR communication module, in step 620, the display device 30 transmits the received device ID, its own device ID, and the broadcast delivery command to the streaming server 10 in step 630.

The mobile terminal 20 enters into a streaming waiting state in step 640. In step 650, the streaming server 10 stores the device ID of the display device 30 to which the multimedia content is being streamed and the device ID of the mobile terminal 20, which has transmitted the broadcast delivery command. The streaming server 10 stops streaming the multimedia content to the display device 30 in step 660 and switches streaming in step 670 so that the mobile terminal 20 continuously reproduces the multimedia content streamed to the display device 30.

Figure 7:
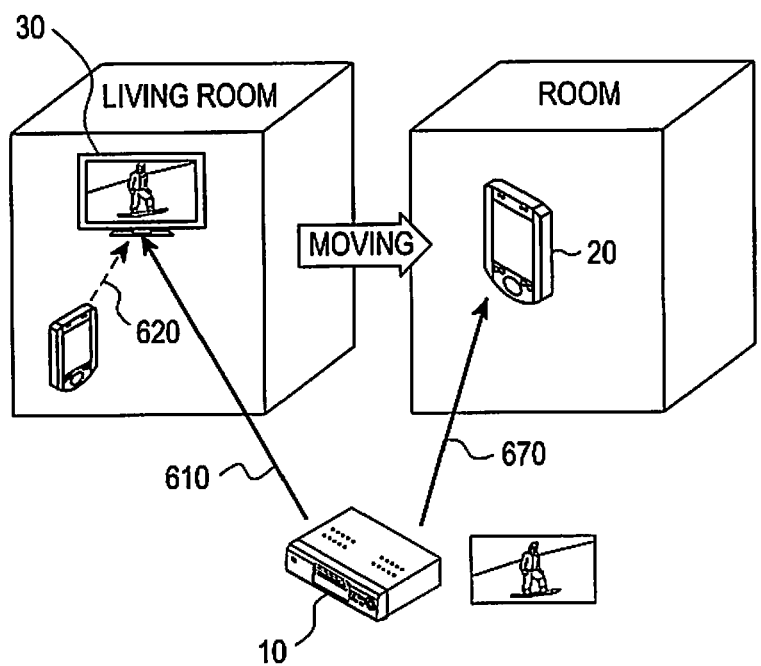
FIG. 7 illustrates a an operation of transmitting and receiving a signal between a server and clients due to movement of a user when performing the operation of FIG. 6.

FIG. 7 illustrates an operation of transmitting and receiving a signal between a server and clients due to movement of a user when performing the operation of FIG. 6.

Referring to FIG. 7, while the user is watching (as shown in FIG. 6, step 610) content through the TV 30 that is the display device 30 in the living room for the first time, the user transmits (in FIG. 6, step 620) a broadcast delivery command to the TV 30 in the living room through local area communication in order to watch the content being reproduced by the TV 30, through the mobile terminal 20. The broadcast delivery command may be transmitted by transmitting IR light toward the TV 30 in the local area communication module 23. Accordingly, the streaming server 10 switches (in FIG. 6, step 670) streaming from the TV 30 in the living room to the mobile terminal 20 so that the user can continuously watch the content through the mobile terminal 20 in a room. At this time, the TV 30 in the living room may stop reproducing the content. Otherwise, the same content may be reproduced by the mobile terminal 20 and the TV 30. If the same content is reproduced by the mobile terminal 20 and the TV 30, step 660 is omitted.

Figure 8:
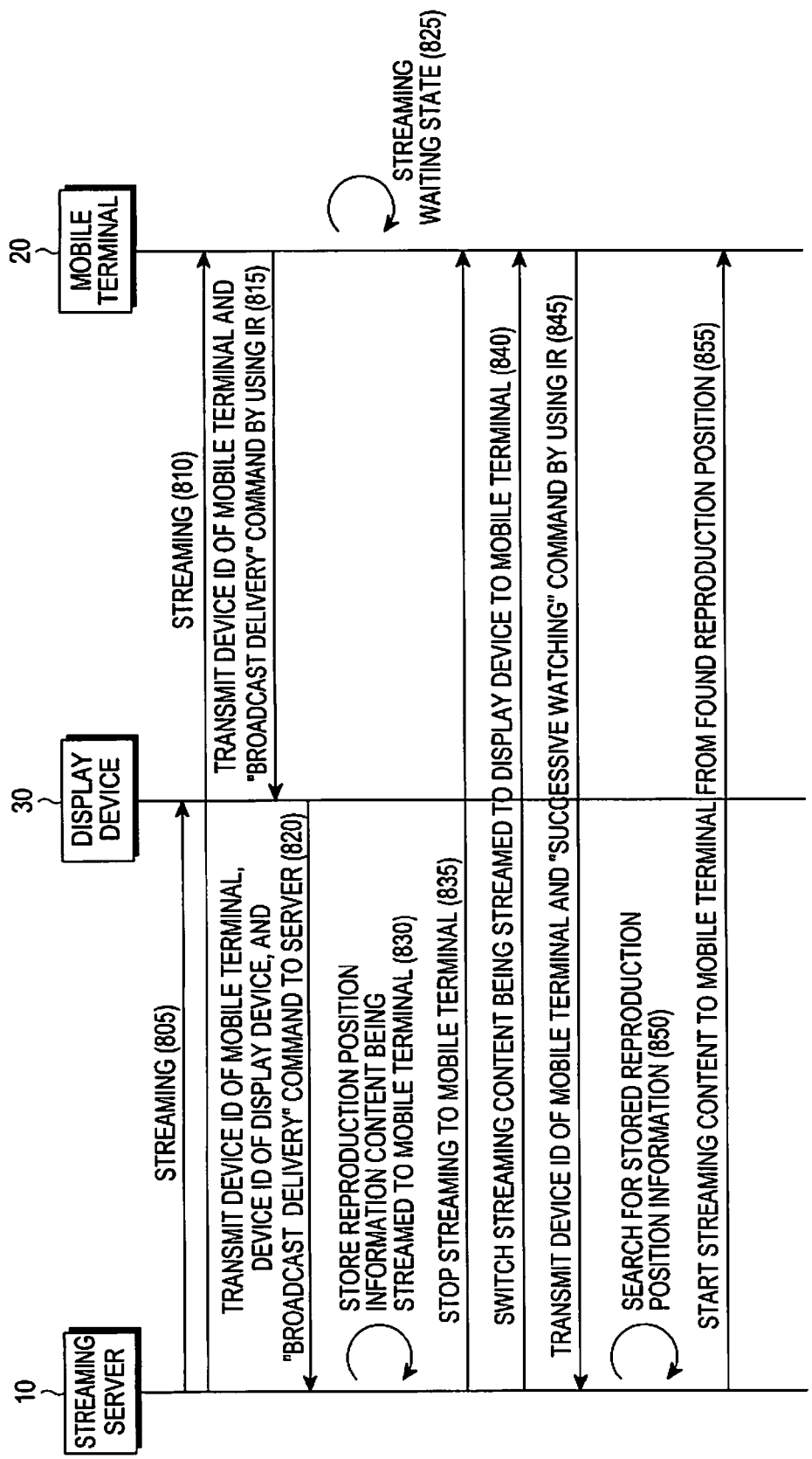
FIG. 8 illustrates an operation of stopping reproducing content being reproduced by an own device and continuously reproducing content being reproduced by another device in the own device in the multimedia content providing system, according to an embodiment of the present invention.

FIG. 8 illustrates an operation of stopping reproducing content being reproduced by an own device and continuously reproducing content being reproduced by another device in the own device in the multimedia content providing system, according to an embodiment of the present invention.

Referring to FIG. 8, the streaming server 10 is streaming individual content to the display device 30 and the mobile terminal 20 in steps 805 and 810, respectively. If the mobile terminal 20 transmits a broadcast delivery command for reproducing content being reproduced by the display device 30 and its own device ID to the display device 30 by using the local area communication module 23 in step 815, the display device 30 transmits the received device ID of the mobile terminal 20, its own device ID, and the broadcast delivery command to the streaming server 10 in step 820.

The mobile terminal 20 enters into a streaming waiting state in step 825. The streaming server 10 stores reproduction position information of content being streamed to the mobile terminal 20 in step 830 and stops streaming the content to the mobile terminal 20 in step 835.

In step 840, the streaming server 10 switches to the mobile terminal 20 the content being streamed to the display device 30.

Thereafter, if a user desires to watch the content, which was streamed to the mobile terminal 20, through the mobile terminal 20 again, the mobile terminal 20 transmits its own device ID and a continuous watching command to the streaming server 10 by using the local area communication module 23 in step 845. The streaming server 10 searches for the reproduction position information, which was stored in step 830, in step 850 and starts streaming the content from the found reproduction position again.

Figure 9:
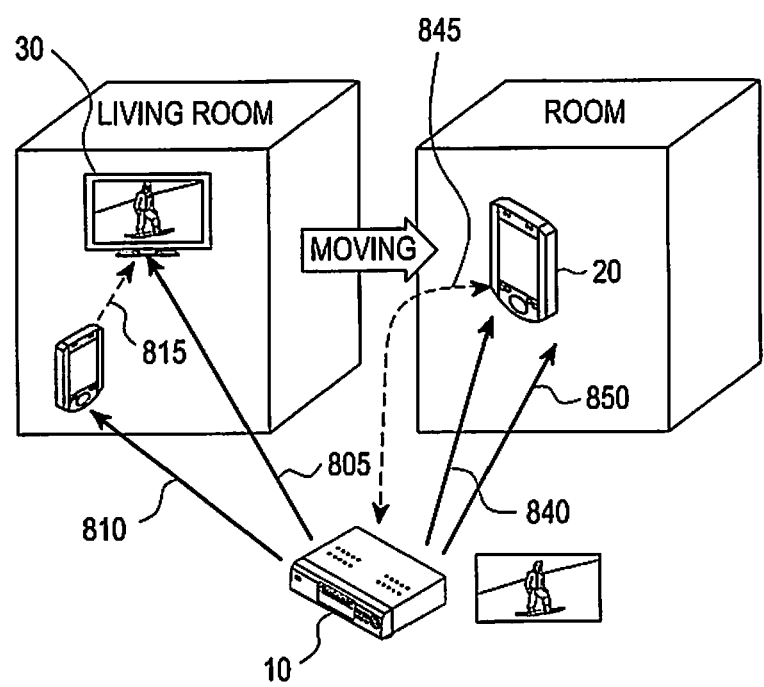
FIG. 9 illustrates an operation of transmitting and receiving a signal between a server and clients due to movement of a user when performing the operation of FIG. 8.

FIG. 9 illustrates a schematic diagram for describing an operation of transmitting and receiving a signal between a server and clients due to movement of a user when performing the operation of FIG. 8.

Referring to FIG. 9, while the TV 30 is reproducing (as shown in FIG. 8, step 805) first content and the mobile terminal 20 is reproducing (in FIG. 8, step 810) second content, the user transmits (in FIG. 8, step 815) a broadcast delivery command to the TV 30 in the living room through local area communication in order to watch the first content being reproduced by the TV 30 through the mobile terminal 20. The broadcast delivery command may be transmitted by transmitting IR light toward the TV 30 in the local area communication module 23 of the mobile terminal 20. Accordingly, the streaming server 10 switches (in FIG. 8, step 840) streaming the first content from the TV 30 in the living room to the mobile terminal 20.

Thereafter, if the user moves to a room and transmits (in FIG. 8, step 845) a continuous watching command to the streaming server 10 in order to watch the second content through the mobile terminal 20 again, the streaming server 10 starts streaming the second content originally reproduced by the mobile terminal 20 to the mobile terminal 20 from a stopping point again.

Figure 10:
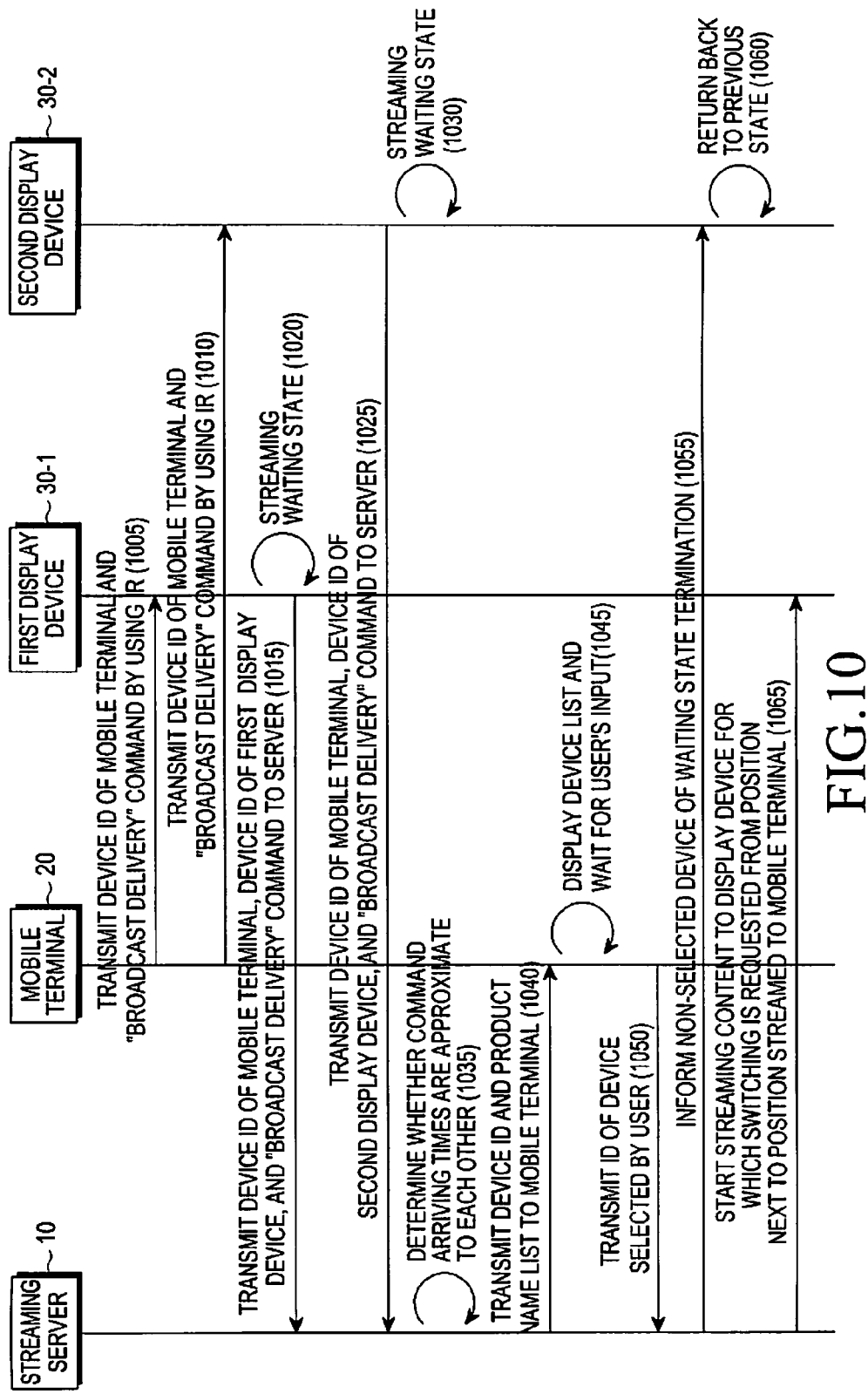
FIG. 10 illustrates an operation of a case where, when an own device requests to continuously reproduce content being reproduced by the own device in another device, a plurality of devices receive the request in the multimedia content providing system, according to an embodiment of the present invention.

FIG. 10 illustrates an operation of a case in which, when an own device requests to continuously reproduce content being reproduced by the own device in another device, a plurality of devices receive the request in the multimedia content providing system, according to an embodiment of the present invention.

FIG. 10 illustrates an operation in which, when the mobile terminal 20 transmits a broadcast delivery command to another device using local area communication in order to continuously reproduce content being reproduced by the mobile terminal 20 in another device, a undesired adjacent device also receives the broadcast delivery command.

Referring to FIG. 10, if the device ID of the mobile terminal 20 and a broadcast delivery command transmitted by the mobile terminal 20 through the local area communication module 23 are received by a first display device 30-1 and a second display device 30-2 in step 1005 and 1010, respectively, the first display device 30-1 transmits the received device ID, its own device ID, and the broadcast delivery command to the streaming server 10 in step 1015 and enters into a streaming waiting state in step 1020. The second display device 30-2 transmits the received device ID, its own device ID, and the broadcast delivery command to the streaming server 10 in step 1025 and enters into a streaming waiting state in step 1030.

In step 1035, the streaming server 10 determines whether arriving times of the broadcast delivery command received in steps 1015 and 1025 are approximate to each other in order to determine whether a plurality of broadcast delivery commands transmitted by the same device are received within a predetermined time. If the arriving times are approximate, the streaming server 10 transmits device IDs and device names of devices, which have transmitted the broadcast delivery command, to the mobile terminal 20 in step 1040. In step 1045, the mobile terminal 20 displays a list of the devices, which have transmitted the broadcast delivery command, and waits for an input of the user. If an input of the user is received, the mobile terminal 20 transmits a selected device ID to the streaming server 10 in step 1050.

The streaming server 10 informs a device, which has not been selected by the user, of a waiting state termination in step 1055. If it is assumed in the current embodiment that the second display device 30-2 has not been selected by the user, the second display device 30-2 enters into a previous operation state in step 1060.

In step 1065, the streaming server 10 starts streaming content, which is being continuously streamed to the mobile terminal 20, to the first display device 30-1.

Figure 11:
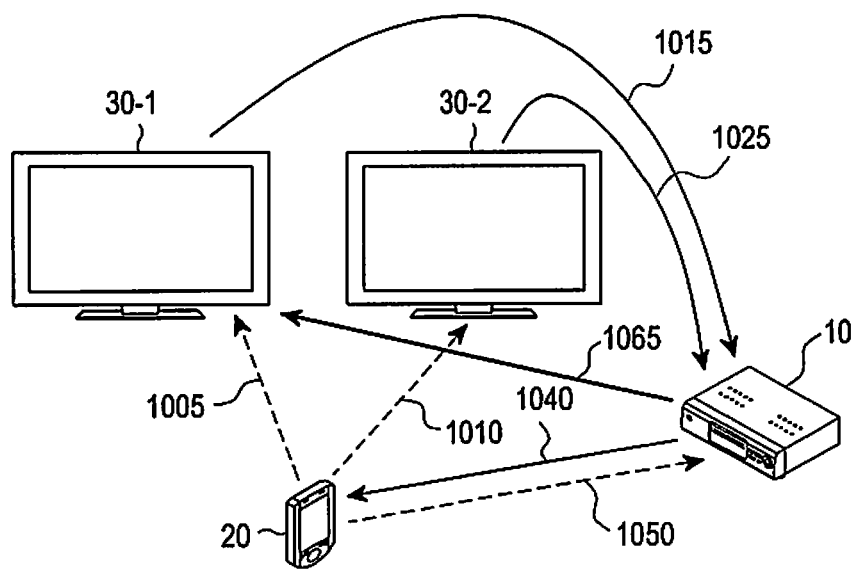
FIG. 11 illustrates an operation of transmitting and receiving a signal between a server and clients due to movement of a user when performing the operation of FIG. 10.

FIG. 11 illustrates an operation of transmitting and receiving a signal between a server and clients due to movement of a user when performing the operation of FIG. 10.

When the user inputs a broadcast delivery command using local area communication, if two devices are placed closely, the two devices may receive (as shown in FIG. 10, steps 1005 and 1010) the broadcast delivery command at the same time due to a reflected wave according to a characteristic of a directional device. The two devices, which have received the broadcast delivery command, transmit (in FIG. 10, steps 1015 and 1025) information to the streaming server 10, and the streaming server 10 determines (in FIG. 10, step 1035) whether the received information is the same command transmitted by one device within a predetermined time (preferably, less than one second). If it is true, the streaming server 10 transmits (in FIG. 10, step 1040) a device list to the mobile terminal 20.

Upon receiving the device list, the mobile terminal 20 displays the device list for the user to select a desired device. Here, device names may be used for a device list displayed on a portable device. The user can instinctively select a device desired to reproduce when the user sees the device list, information regarding the selected device is transmitted (in FIG. 10, step 1050) to the streaming server 10, and the streaming server 10 switches streaming so that the selected device 30-1 continuously reproduces content being reproduced by the mobile terminal 20.

According to the present invention, a user can continuously watch multimedia content, which the user is watching, through another device in a multimedia content streaming environment by operating a home server.

Additionally, a mutual device recognition process (e.g., PIN code exchange in Bluetooth®) can be omitted by using local area communication, such as IR communication, having directivity. Further, a problem due to a reflected wave, which may occur according to a characteristic of a directional device, can be effectively solved.

According to the present invention, a device can seamlessly deliver its own content to another device and return back in a multimedia streaming environment by using such a communication scheme. Additionally, the device can seamlessly continuously reproduce content being reproduced by another device. Further, a streaming server can convert content to reproducible content and transmit the reproducible content by considering the performance of each device based on information regarding collected devices.

Accordingly, while the user is watching content through a portable device, such as a mobile terminal or a Personal Media Player (PMP), the user can continuously watch the content through a device, such as a TV, installed in a room by continuously reproducing the content through the TV. Moreover, the user can continuously reproduce content being streamed to the TV in the room through the PMP. Further, the user can stop reproducing content through a device and receive and watch other content being reproduced by another device through the device.

As described above, operations and configurations of a method and apparatus for providing streaming information in a multimedia broadcasting system according to embodiments of the present invention can be achieved. While the invention has been shown and described with reference to a certain embodiment thereof, it will be understood by those skilled in the art that various changes in form and detail may be made therein without departing from the spirit and scope of the invention as defined by the appended claims and their equivalents.

What is claimed is:

1. A method for continuously reproducing content, the method comprising:
   receiving, at a first device, from a content server, information relating to a registration process; and
   transmitting, by the first device, in order to have a second device reproduce content being streamed to the first device by the content server, a first request message including an IDentification (ID) of the first device to the second device using local area communication,
   wherein the ID of the first device is generated by the content server based on an IP address, a product name, and a reproduction capability of the first device transmitted during the registration process.

2. The method of claim 1, further comprising:
   transmitting, by the first device, in order to have the first device continuously reproduce content being streamed to the second device by the content sever, a second request message including the ID of the first device to the content server using the local area communication.

3. The method of claim 2, further comprising:
   receiving, by the second device, the first request message transmitted by the first device and the ID of the first device through the local area communication;
   transmitting, by the second device, the first request message, the ID of the first device, and ID information of the second device to the content server;
   stopping, by the content server, streaming to the first device;
   storing, by the content server, the ID of the first device and the ID of the second device; and
   switching, by the content server, the streaming to the first device to the second device so that the second device continuously reproduces the content.

4. The method of claim 3, further comprising:
determining, by the content server, whether a device, which has transmitted the second request message, is identical to a device which has transmitted the first request message;
if the device, which has transmitted the second request message, is identical to the device which has transmitted the first request message, stopping, by the content server, streaming of the content to the second device and switching the streaming so that the first device continuously reproduces the content.

5. The method of claim 3, wherein switching the streaming comprises converting, by the content server, the content being streamed to reproducible content by considering reproduction capability of the device to be streamed to.

6. The method of claim 3, wherein switching the streaming comprises, if reproduction of the content being streamed is impossible, transmitting, by the content server, a message for informing the device that has requested the streaming switch of the impossibility of reproduction.

7. The method of claim 2, further comprising:
transmitting, by the first device, a third request message for continuously reproducing content being reproduced by the second device to the second device in order for the first device to continuously reproduce the content being reproduced by the second device.

8. The method of claim 7, further comprising:
transmitting, by the second device, a received third request message, the ID of the first device, and ID information of the second device to the content server;
storing, by the content server, the ID of the first device and the ID of the second device; and
switching, by the content server, the streaming to the second device to the first device so that the first device continuously reproduces the content.

9. The method of claim 8, wherein switching of the content being streamed to the second device to the first device comprises, if the first device is reproducing another content different from the content being streamed, storing, by the content server, a reproduction position of the another content being streamed to the first device, stopping streaming of the another content, and switching the streaming so that the first device continuously produces the content being streamed to the second device.

10. The method of claim 9, further comprising:
transmitting, by the first device, a fourth request message for reproducing the another content again to the content server in order to continuously reproduce the another content; and
searching, by the content server, for the stored reproduction position of the another content and starting streaming for the first device to reproduce the another content from the found reproduction position.

11. The method of claim 1, wherein the local area communication is InfraRed (IR) communication.

12. The method of claim 1, further comprising:
if the first request message and the ID of the first device, which have been transmitted by the first device using local area communication, are also received by a plurality of devices, retransmitting, by the plurality of devices, the received first request message, and the ID of the first device, and ID information of each device of the plurality of devices to the content server;
if the content server receives a plurality of retransmitted first request messages within a predetermined time, determining, by the content server, if a single device of the plurality of devices retransmitted the plurality of retransmitted first request messages;
if the plurality of retransmitted first request messages have been transmitted by a single device, transmitting, by the content server, information regarding IDs and product names of the plurality of devices, which have received the first request message, to the single device, which has retransmitted the first request message;
displaying, by the first device, the received product names of the plurality of devices;
if the single device is selected by a user, stopping, by the content server, streaming to the first device;
storing, by the content server, the ID of the first device and an ID of the single device selected by the user; and
switching, by the content server, the streaming so that the single device selected by the user continuously reproduces the content being streamed to the first device.

13. An apparatus for reproducing content, the apparatus comprising:
a local area communication module configured to perform local area communication;
a network module configured to transmit and receive the content and a control signal through a communication network using Internet Protocol (IP);
an input unit configured to receive an input from a user;
a display unit configured to reproduce the content; and
a controller configured to receive, from a content server, information relating to a registration process, reproduce the content being streamed from the content server, transmit a first request message to have a second device reproduce the content being reproduced by the controller, the first request message including an IDentification (ID) of the apparatus and being transmitted to the second device using the local area communication,
wherein the ID of the apparatus is generated by the content server based on an IP address, a product name, and a reproduction capability of the apparatus transmitted during the registration process.

14. The apparatus of claim 13, wherein the controller is further configured to transmit a second request message to have the apparatus reproduce the content being streamed by the content server to the second device, the second request message including the ID of the apparatus and being transmitted to the content server using the local area communication.

15. The apparatus of claim 13, wherein the controller is further configured to transmit a second request message for continuously reproducing the content being reproduced by the second device and the ID of the apparatus to the second device using the local area communication in order to continuously reproduce second content being reproduced by the second device.

16. The apparatus of claim 13, wherein the local area communication is an InfraRed (IR) communication.

17. A content server for providing content in a multimedia data providing system, the content server comprising:
a network module configured to transmit and receive content and a control signal through a communication network using Internet Protocol (IP);
a content depository configured to store the content;
a connection management unit configured to broadcast location information of the content server through the network module and to manage addresses and product names of a plurality of client devices; and
a controller configured to, if a first request message to have a second device reproduce the content being streamed to a first device is received from the first device, generate an IDentification (ID) of the first device, wherein the ID of the first device is generated by the content server based on an IP address, a product name, and a reproduction capability of the first device transmitted during a registration process, and if an ID of the second device is received from the second device, stop streaming to the first device, store the ID of the first device and the ID of the second device, and switch streaming so that the second device continuously reproduces the content being streamed.

18. The content server of claim 17, wherein the controller is further configured, if a second request message to have the first device continuously reproduce content being streamed to the second device is received from the first device, to stop streaming to the second device and to switch streaming so that the first device continuously reproduces the content being streamed.

19. The content server of claim 18, wherein the controller is further configured to determine whether a device, which has transmitted the second request message, is identical to a device, which has transmitted the first request message, and if the device, which has transmitted the second request message, is identical to the device, which has transmitted the first request message.

20. The content server of claim 18, wherein, if the streaming is switched, the controller is further configured to convert the content being streamed to reproducible content by considering reproduction capability of the device to be streamed to.

21. The content server of claim 18, wherein, if the streaming is switched, and if reproduction of the content being streamed is impossible, the controller is further configured to transmit a message for informing of the reproduction impossibility to the device, which has transmitted either the first or second request message.

22. The content server of claim 18, wherein, if a plurality of request messages are also received within a predetermined time, the controller is further configured to determine whether the plurality of request messages have been transmitted by a single device, and if the plurality of request messages have been transmitted by a single device, transmit information regarding IDs and product names of a plurality of devices, which have received the first request message, to the single device, which has transmitted the first request message.

23. The content server of claim 18, wherein, if the second request message for continuously reproducing the content being reproduced by the second device and the ID of the first device are received from the first device using the local area communication, the controller is further configured to store the ID of the first device and the ID of the second device, stop streaming the content to the first device, and switch streaming so that the first device continuously reproduces second content being streamed to the second device.

24. The content server of claim 23, wherein switching the streaming of the controller for the first device to continuously reproduce the second content being streamed to the second device indicates that, if the first device is reproducing first content different from the second content, the content server is further configured to store a reproduction position of the first content, stop streaming the first content, and switch streaming so that the first device continuously reproduces the second content being streamed to the second device.

25. The content server of claim 24, wherein, if a fourth request message for continuously reproducing the first content in the first device is received again from the first device, the controller is further configured to search for the stored reproduction position of the first content and start streaming so that the first device reproduces the first content from the found reproduction position.

* * * * *